United States Patent
Jones et al.

(10) Patent No.: US 9,785,994 B2
(45) Date of Patent: Oct. 10, 2017

(54) PROVIDING COMPARISON SHOPPING EXPERIENCES THROUGH AN OPTICAL HEAD-MOUNTED DISPLAYS IN A WEARABLE COMPUTER

(71) Applicant: BANK OF AMERICA CORPORATION, Charlotte, NC (US)

(72) Inventors: Alicia C. Jones, Fort Mill, SC (US); David M. Grigg, Rock Hill, SC (US); Carrie Anne Hanson, Charlotte, NC (US); Richard Andrew Starbuck, Walnut Creek, CA (US)

(73) Assignee: Bank of America Corporation, Charlotte, NC (US)

( * ) Notice: Subject to any disclaimer, the term of this patent is extended or adjusted under 35 U.S.C. 154(b) by 850 days.

(21) Appl. No.: 14/250,137

(22) Filed: Apr. 10, 2014

(65) Prior Publication Data
US 2015/0294389 A1    Oct. 15, 2015

(51) Int. Cl.
G06Q 30/00    (2012.01)
G06Q 30/06    (2012.01)
G06K 9/00    (2006.01)

(52) U.S. Cl.
CPC ..... *G06Q 30/0629* (2013.01); *G06K 9/00671* (2013.01)

(58) Field of Classification Search
CPC ........... G06K 9/00671; G06Q 30/0253; G06Q 30/0601
USPC ............................................... 705/26.1, 27.1
See application file for complete search history.

(56) References Cited

U.S. PATENT DOCUMENTS

| | | |
|---|---|---|
| 7,349,557 B2 | 3/2008 | Tibor |
| 7,398,253 B1 | 7/2008 | Pinnell |
| 7,606,770 B2 | 10/2009 | Pinnell |
| 7,647,300 B2 | 1/2010 | Nevill-Manning et al. |
| 7,716,129 B1 | 5/2010 | Tan et al. |
| 7,752,077 B2 | 7/2010 | Holden et al. |
| 8,060,411 B2 | 11/2011 | Shestakov et al. |
| 8,485,422 B2 | 7/2013 | Rometty et al. |
| 8,490,865 B2 | 7/2013 | Randazza et al. |
| 8,509,483 B2 | 8/2013 | Lawrence Ashok Inigo |

(Continued)

OTHER PUBLICATIONS

Anonymous, "Check your glasses at the door," Film Journal International, Jul. 2013.*

*Primary Examiner* — Brandy A Zukanovich
(74) *Attorney, Agent, or Firm* — Michael A. Springs; Moore & Van Allen PLLC; Peter B. Stewart

(57) ABSTRACT

Embodiments of the invention are directed to systems, methods and computer program products for aiding with purchase inquiries through an optical head-mounted display in a wearable computer. An exemplary apparatus is configured to receive information captured by the wearable computer; transmit, to at least one database, the received information including a primary identifier and at least one secondary identifier; retrieve, from at least one database, detailed information related to the first item of interest and the at least one additional item of interest, where the detailed information is associated with the primary identifier and the at least one secondary identifier; and present, on the optical head-mounted display in the wearable computer, the detailed information related to the first item of interest and the at least one additional item of interest, in a comparison format.

25 Claims, 4 Drawing Sheets

(56) References Cited

U.S. PATENT DOCUMENTS

| | | |
|---|---|---|
| 8,538,827 B1 | 9/2013 | Dryer et al. |
| 2010/0146263 A1 | 6/2010 | Das et al. |
| 2012/0203700 A1 | 8/2012 | Ornce et al. |
| 2013/0085345 A1* | 4/2013 | Geisner .................. G06Q 30/00 600/300 |
| 2013/0110658 A1 | 5/2013 | Lyman et al. |
| 2013/0212024 A1 | 8/2013 | Mattsson et al. |
| 2013/0246203 A1 | 9/2013 | Laracey |
| 2013/0246258 A1 | 9/2013 | Dessert |
| 2013/0246260 A1 | 9/2013 | Barten et al. |
| 2013/0293580 A1* | 11/2013 | Spivack ............. G06Q 30/0643 345/633 |
| 2014/0006190 A1 | 1/2014 | Loomis, III et al. |

* cited by examiner

PROVIDING COMPARISON SHOPPING EXPERIENCES THROUGH AN OPTICAL HEAD-MOUNTED DISPLAYS IN A WEARABLE COMPUTER

BACKGROUND

In today's technological age wearable computers are being streamlined into many different industries for uses such as sensory integration, behavioral modeling, health care monitoring systems, service management, mobile device (e.g. smartphones), electronic textiles, fashion design in the like. With wearable technology being used in conjunction with everyday devices such as mobile phones, there is an opportunity to expand upon the use of wearable computers to accomplish everyday task, including shopping.

Wearable computers may additionally comprise optical head-mounted displays that project images to users. The optical head mounted displays and wearable computers in general are commonly operated using commands that allow the device to be primarily hands free thus freeing the user or an individual wearing the computer to focus on other task versus being tied to the display of a hand held device such as a mobile phone or the like.

Customers are frequently interested in ensuring that they are receiving the best deal possible when shopping for particular products. As a result, many customers seek to compare the characteristics of various products with one another before making a final purchase. Presently, customers may accomplish such a task by manually searching for detailed information related to individual products or by using online websites to compare details related to individual products. However, this process can be quite burdensome, especially in instances where the user is obtaining information for a large variety of products.

Therefore, there is a need for a system that can ease the burden of a user's shopping experience by providing a comparative shopping experience through a head-mounted display in a wearable computer.

BRIEF SUMMARY

Embodiments of the invention are directed to systems, methods, and computer program products for providing comparison shopping experiences through an optical head-mounted display in a wearable computer. An exemplary apparatus for providing comparison shopping experiences through an optical head-mounted display in a wearable computer may comprise a memory, a computing processor, and a module stored in memory, said module comprising instruction code executable by one or more computing processors, and configured to cause the one or more computing processors to receive, from the wearable computer, information captured by the wearable computer, wherein the received information includes: a primary identifier of a first item of interest to an individual wearing the wearable computer and viewing the first item of interest through the optical head-mounted display, and at least one secondary identifier of at least one additional item of interest to the individual wearing the wearable computer. Transmit, to at least one database, the received information including the primary identifier and the at least one secondary identifier. Retrieve, from at least one database, detailed information related to the first item of interest and the at least one additional item of interest, wherein the detailed information is associated with the primary identifier and the at least one secondary identifier, and present, on the optical head-mounted display in the wearable computer, the detailed information related to the first item of interest and the at least one additional item of interest, wherein the detail information is presented in a comparison format.

In some embodiments, the module is further configured to cause one or more computers to receive, from a user, a command that indicates the user is in a shopping environment or indicates the user has located an item of interest.

In some embodiments, the module is further configured to cause one or more computers to launch an application for providing comparison shopping experiences through an optical head-mounted display in the wearable computer, wherein the application is executed by the wearable computer.

In some embodiments, the module is further configured to cause one or more computers to automatically identify that the user is in a shopping environment.

In some embodiments, the one or more computers to automatically identify that the user is a shopping environment based at least partially on determining the user's location.

In some embodiments, the module is further configured to cause one or more computers to receive, from the user, a command that prompts the apparatus to capture information related to one or more items of interest, and in response to receiving the command, capture the information related to the one or more items of interest.

In some embodiments, the module is further configured to cause one or more computers to extract at least one of the primary identifier or the at least one secondary identifier from the received information.

In some embodiments, the module is further configured to cause one or more computers to search, the at least one database, for detailed information related to the first item of interest and the at least one additional item of interest.

In some embodiments, the module is further configured to cause one or more computers to determine that the received information is not satisfactory for retrieving detailed information related to the first item of interest and the at least one additional item of interest, and request, from the user, additional information related to the first item of interest and the at least one additional item of interest, wherein the additional information includes a new primary identifier of the first item of interest to the individual wearing the wearable computer, and at least one new secondary identifier of the at least one additional item of interest to the individual wearing the wearable computer.

In some embodiments the at least one database comprises information related to one or more items that are comparable to the item of interest.

In some embodiments the received information includes wireless communication from at least one of the first item of interest or the at least one additional interest.

In some embodiments the received information includes visual indicia related to at least one of the first item of interest or the at least one additional interest, and wherein the module is further configured to cause one or more computers to read the visual indicia.

In some embodiments, the module is further configured to cause one or more computers to determine at least one of an identifier or an item of interest based at least partially on object recognition.

An exemplary method for aiding with purchase inquiries, whereby the apparatus provides comparison shopping experiences through an optical head-mounted display in a wearable computer, may comprise one or more steps including but not limited to receiving, from the wearable computer, information captured by the wearable computer, wherein the received information includes a primary identifier of a first item of interest to an individual wearing the wearable computer and viewing the first item of interest through the optical head-mounted display, and at least one secondary identifier of at least one additional item of interest to the individual wearing the wearable computer. Transmitting, to at least one database, the received information including the primary identifier and the at least one secondary identifier. Retrieving, from at least one database, detailed information related to the first item of interest and the at least one additional item of interest, wherein the detailed information is associated with the primary identifier and the at least one secondary identifier, and presenting, on the optical head-mounted display in the wearable computer, the detailed information related to the first item of interest and the at least one additional item of interest, wherein the detail information is presented in a comparison format.

In some embodiments, the method further comprises launching an application for providing comparison shopping experiences through an optical head-mounted display in the wearable computer, wherein the application is executed by the wearable computer.

In some embodiments, the method further comprises automatically identifying that the user wearing is in a shopping environment.

In some embodiments, the method further comprises receiving, from the user, a command that prompts the apparatus to capture information related to one or more items of interest, and in response to receiving the command, capturing the information related to the one or more items of interest.

In some embodiments, the method further comprises extracting at least one of the primary identifier or the at least one secondary identifier from the received information.

In some embodiments, the method further comprises searching, the at least one database, for detailed information related to the first item of interest and the at least one additional item of interest.

An exemplary computer program product for aiding with purchase inquiries, whereby the apparatus provides comparison shopping experiences through an optical head-mounted display in a wearable computer, the computer program product may comprise a non-transitory computer-readable medium comprising a set of codes for causing a computer to receive, from the wearable computer, information captured by the wearable computer, wherein the received information includes a primary identifier of a first item of interest to an individual wearing the wearable computer and viewing the first item of interest through the optical head-mounted display, and at least one secondary identifier of at least one additional item of interest to the individual wearing the wearable computer. Transmit, to at least one database, the received information including the primary identifier and the at least one secondary identifier. Retrieve, from at least one database, detailed information related to the first item of interest and the at least one additional item of interest, wherein the detailed information is associated with the primary identifier and the at least one secondary identifier, and present, on the optical head-mounted display in the wearable computer, the detailed information related to the first item of interest and the at least one additional item of interest, wherein the detail information is presented in a comparison format.

In some embodiments, the computer program product further comprises a set of codes for causing a computer to launch an application for providing comparison shopping experiences through an optical head-mounted display in the wearable computer, wherein the application is executed by the wearable computer.

In some embodiments, the computer program product further comprises a set of codes for causing a computer to automatically identify that the user wearing is in a shopping environment.

In some embodiments, the computer program product further comprises a set of codes for causing a computer to receive, from the user, a command that prompts the apparatus to capture information related to one or more items of interest, and in response to receiving the command, capture the information related to the one or more items of interest.

In some embodiments, the computer program product further comprises a set of codes for causing a computer to extract at least one of the primary identifier or the at least one secondary identifier from the received information.

In some embodiments, the computer program product further comprises a set of codes for causing a computer to search, the at least one database, for detailed information related to the first item of interest and the at least one additional item of interest.

BRIEF DESCRIPTION OF THE DRAWINGS

Figure 1:
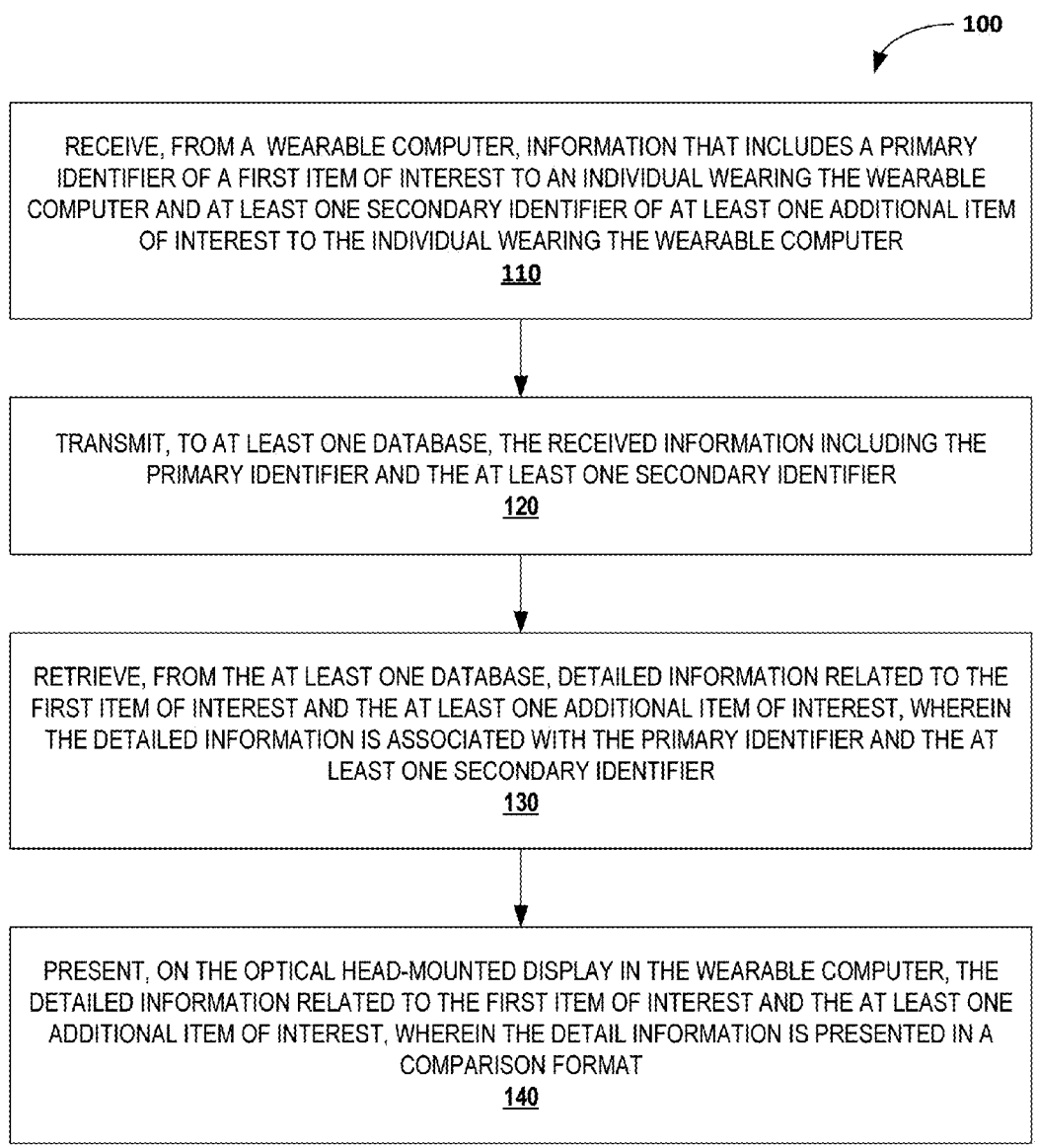
Figure 2:
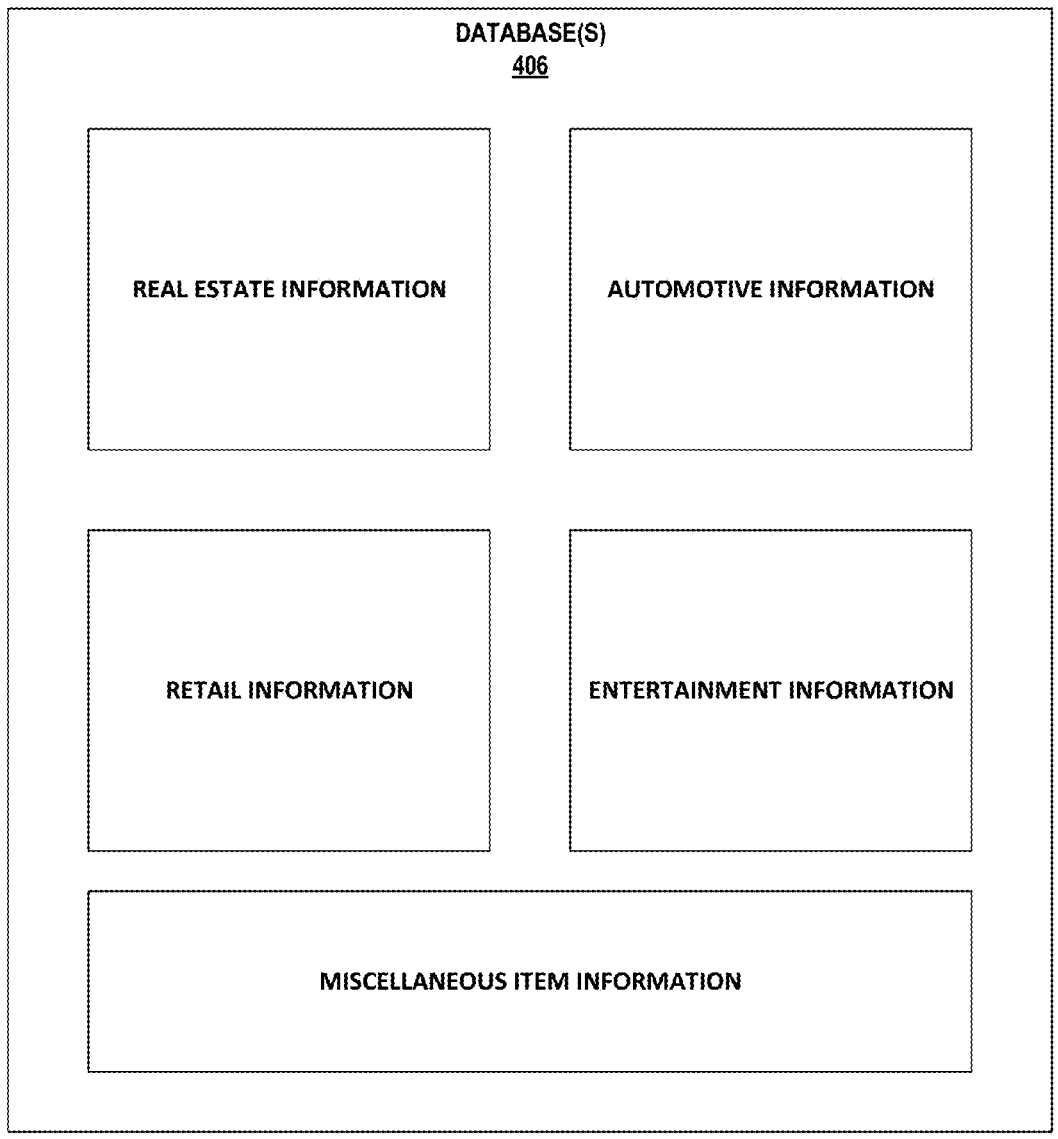
Figure 3:
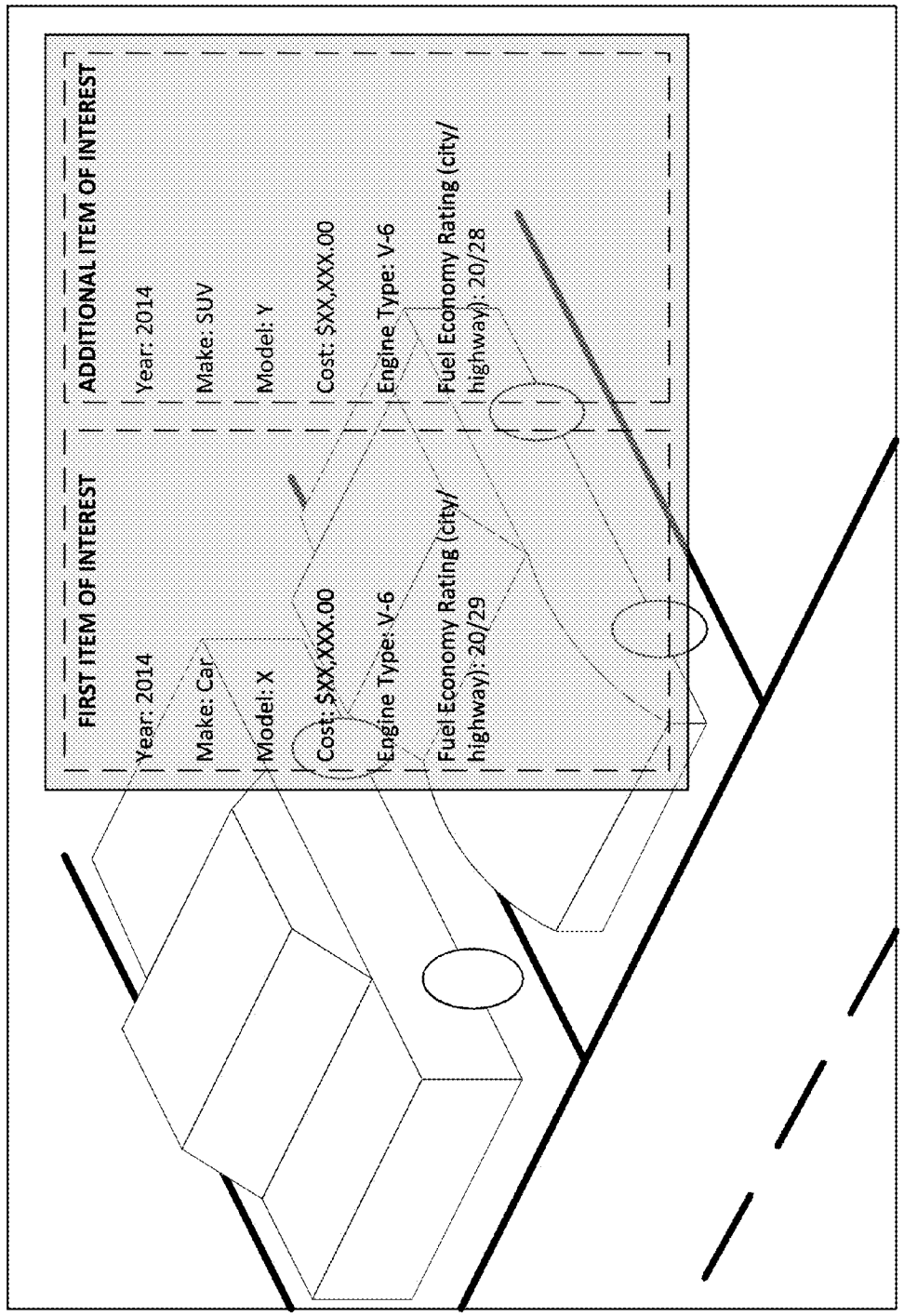
Figure 4:
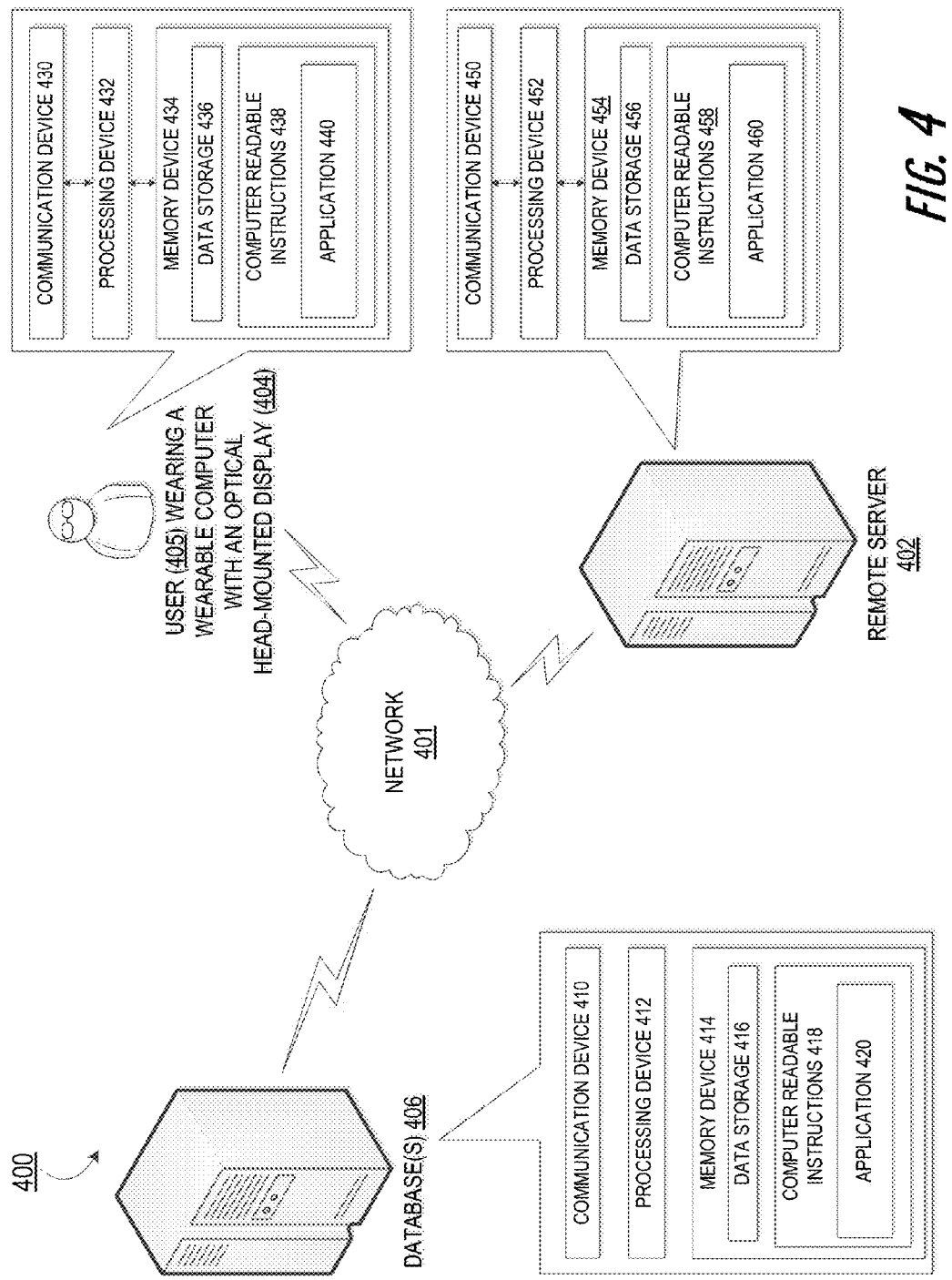

Having thus described embodiments of the invention in general terms, reference will now be made to the accompanying drawings, where:

FIG. 1 is a flow chart illustrating a general process flow for providing comparison shopping experiences through an optical head-mounted display in a wearable computer, in accordance with embodiments of the present invention;

FIG. 2 is a diagram illustrating a database for use in providing comparison shopping experiences through an optical head-mounted display in a wearable computer, in accordance with embodiments of the present invention;

FIG. 3 is a diagram illustrating an example of an optical head-mounted display presenting comparison shopping information, in accordance with embodiments of the present invention; and FIG. 4 is a system diagram illustrating a network environment for providing comparison shopping experiences through an optical head-mounted display in a wearable computer, in accordance with embodiments of the present invention.

DETAILED DESCRIPTION OF EMBODIMENTS OF THE INVENTION

Embodiments of the invention are directed to systems, methods and computer program products for providing comparison shopping experiences through an optical head-mounted display in a wearable computer. The invention enables an individual to identify various items of interest using a wearable computer having an optical head-mounted display therein and presents, on the optical head-mounted display, information comparing the items of interest. Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, an "entity" may be a financial institution. For the purposes of this invention, a "financial institution" may be defined as any organization, entity, or the like in the business of providing comparative shopping experiences through an optical head mounted display in a wearable computer. In other embodiments, the entity may be any organization, entity, or business in the like of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, a merchant rewards account, or the like. The account is associated with and/or maintained by the entity. In other embodiments, an entity may not be a financial institution. In still other embodiments, the entity may be the merchant itself.

In some embodiments, the "user" may be an individual that is wearing a wearable computer. In other embodiments, the "user: may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded), or an individual interested in pursuing a transactional purchase with a merchant.

As used herein a wearable computer may refer to an electronic computing device that can be worn by a user under, with or on top of clothing. Wearable computers may include, but not be limited to, glasses, watches (and/or other jewelry), articles of clothing, medical braces, and the like. As used herein an optical head mounted display (OHMD) may refer to a wearable display, within and/or operatively connected to the wearable computer, that is configured to reflect projected images to a user wearing the wearable computer such that the user is further capable to see through the projected image.

The present invention is directed towards system, apparatuses, method, and computer program products for providing comparison shopping experiences through an optical head mounted display in a wearable computer. In general, the system is configured to receive captured information from the wearable computer that includes a primary and at least one secondary identifier of items of interest to an individual wearing the wearable computer and viewing the first item of interest through the optical head-mounted display. Types of items interest may include real estate, automotive vehicles, retail, financial Items (e.g. budgets, available balances, and the like). Types of identifiers may include photos, associated visual indicia, SKU numbers, item name, item location (e.g. house address), and the like. In an exemplary embodiment initiating a comparison shopping experience can be accomplished by the system receiving a command from the user that indicates the user is in a shopping environment or indicates the user has located an item of interest, or the system automatically identify that the user is in a shopping environment based on location determination (e.g. GPS, geofencing, object recognition, location recognition, and the like). The system may capture items of interest and primary identifiers in response to receiving a command from the user that prompts the apparatus to capture information related to one or more items of interest, wirelessly communicating with items of interest to receive identifiers, automatically determining items of interest (e.g. based on object recognition in comparison to a user wish list), identification through visual indicia/image readable code (e.g. barcodes, QR codes, and the like), and/or various other method or any combination of the aforementioned. The system is configured to transmit the received information including the primary identifier and the at least one secondary identifier. The received information is transmitted to at least one database that includes detailed information related to various items. The system may automatically extract the primary identifier from the readable image. The system is configured to retrieve the detailed information related to the first item of interest and the at least one additional item of interest from the database. The system may additionally retrieve and present detailed information related to comparable items (e.g. purchase suggestions). The system is configured to present the retrieved detailed information in a comparison format on the optical head-mounted display in the wearable computer. The presented detailed information may include diagrams, financial forecast, and the like.

Referring now to FIG. 1, a high level process flow for providing a comparison shopping experience through an optical head-mounted display in a wearable computer 100 is illustrated in accordance with one embodiment of the present invention, which will be discussed in further detail throughout this specification. A comparison can be made for several parameters associated with different items including, but not limited not limited to, price comparison, a comparison of associated loan values, a comparison of technical specifications, and the like. As illustrated, the method may comprise a plurality of steps, including but not limited to, receiving from a wearable computer information that identifies items of interest to the individual wearing the wearable computer 110, transmitting the received information to at least database 120, retrieving, from the at least one database, detailed information related to the items of interest 130, and presenting the detailed information in a comparison format on an optical head-mounted display in the wearable computer 140.

As represented by step 110, the system first receives information from a wearable computer. The received information generally comprises any indicators that can be used to identify items that an individual/user wearing the wearable computer, or that has the wearable computer in his/her possession, may be interested in purchasing and/or viewing detailed information for. To this extent, the received information may include one or more identifiers for at least two (2) items of interest that the user of the wearable computer has specified. In an exemplary embodiment, the received information includes a primary identifier of a first item of interest to an individual wearing the wearable computer, and at least one secondary identifier of at least one additional item of interest to the individual wearing the wearable computer.

In one embodiment, an item of interest may be related to items that can be purchased by the user such as automotive vehicles, real estate, and/or other retail items. In an embodiment where the item of interest is an automotive item such as a car, the identifiers may include, but not be limited to, a vehicle identification number (VIN), a photo of the vehicle, year of car, make of car, model of car, car color, body style, engine size, license plate number, and the like. In an embodiment where the item of interest is a real estate item such as a house, the identifiers may include, but not be limited to, the address of the house, a photo of the house, a neighborhood name, type (house, town home, condo, apartment, and the like), and the like. In an embodiment where the item of interest is a retail item, the identifiers may include, but not be limited to, a photo of the item, the item name, a stock keeping unit (SKU) number, the item manufacturer, and the like. As such, the system may be able to access various databases and/or websites that contain detailed information about the items including databases and/or websites that are maintained by the item manufacturers/builders, selling merchants/entities, third party entities, and the like. In another embodiment, an item of interest may be related to a financial item such as a financial budget, a long term cost projection and/or trend, an account available balance, a wish list, and the like. As such, the system may be able to access various databases and/or websites that are associated with financial institutions and the like.

In some embodiments, receiving information comprises the system receiving a command from a user that indicates the user is in a shopping environment and/or has located an item of interest. The commands may include, but not be limited to, voice commands, motion commands, gesture recognition, eye tracking, text/instructions from an input device (e.g. keyboard, touch pad, buttons, and the like) associated with the wearable computer, and/or any combination of the aforementioned. In response to receiving a command that indicates the user is in a shopping environment and/or has location an item of interest, the system may launch an application within the wearable computer for providing comparison shopping experiences through an optical head-mounted displays in the wearable computer. The application may allow the wearable computer to interface with specific databases that may contain detailed information related to the items of interest or other comparable items, the application may further allow the wearable computer to communicate with a main server within the system for providing comparison shopping experience, or other devices that may aid in providing comparison shopping experiences (e.g. user mobile device). The wearable computer may be configured to display information related to items of interest with or without the application for providing comparison shopping experiences being launched. In an exemplary embodiment, the system may receive a voice command from the user that indicates the user is in a shopping environment and/or has located items of interest. For example, the user may verbally state a command, such as "wearable computer, please enter comparative shopping mode", where the command may prompt the system to launch the application as the user has indicated that they're in a shopping environment. In other embodiments, receiving information comprises the system receiving wireless communication from at least one item of interest. To this extent, the item of interest may transmit one or more identifiers that are associated with the item to the system in general or in particular to the wearable computer. In yet another embodiment, receiving information comprises the system receiving visual indicia or other image readable code (e.g. barcode, quick response code (QR code), hologram, and the like) that is associated with an item of interest. To this extent, in response to the wearable computer scanning and/or capturing the visual indicia it may receive information related to one or more identifiers that are associated with a particular item or a plurality of items of interest. For example, a single barcode may encompass information that is related to more than one item that the user is interested in. By scanning the barcode the system may receive a plurality of identifiers to be used in later comparison.

In an alternate embodiment, the system, and in particular a wearable device having a camera or another means for capturing images/sounds, may be able to automatically identify that the user wearing the wearable computer is in a shopping environment (mall, car lot, grocery store, etc.) without receiving a specific command from the user to indicate their location. The system may identify that the user is in a shopping environment based on image, object and/or sound recognition. For example, if a user is at a car lot the system may recognize that the user is located at a car lot either based on an orientation of the cars within the lot or based on recognizing a sign or label that denotes the current location is a car lot. In another embodiment, the system may determine the user's location based on global positioning system (GPS) coordinates. To this extent, the wearable device can possess an internal navigation system that allows it to determine a user's physical location and render GPS coordinates. The rendered GPS coordinates may be associated with a particular location or geofence that indicates the user is in location where purchases can typically be made. After the system has automatically identified that the user wearing the wearable computer is in a shopping environment (mall, car lot, grocery store, etc.), the system may similarly launch the application for providing comparison shopping experiences through an optical head-mounted displays in the wearable computer as previously discussed herein.

In some embodiments, the system may be configured to automatically identify and/or determine items of interest using a combination of methods. For example the system may automatically identify and/or determine items of interest by comparing objects that are recognizable within the shopping environment to a wish list of the user that is either maintained on the wearable computer or accessible via a remote information source such as a database, server, or website. In this way, the system may constantly and/or periodically poll the remote information source to compare the objects within the shopping environment to objects that are on a wish list of the user. If an object on the wish list is detected the system may then automatically capture one or more identifiers associated with the object using various methods discussed herein.

Similarly, after receiving a command from the user that indicates the user is in a shopping environment and/or has located an item of interest, the system may additionally receive a command that prompts the system to capture one or more items of interest for later comparison. As such, the system may capture items of interest or information associated with an item of interest in response to the user providing a command that indicates the system should proceed to capture one or more items of interest or related information. The captured information may comprise a snapshot photo captured using a camera associated with the wearable computer, a voice recording from a microphone associated with the wearable computer, text input from an input device associated with the wearable computer, and/or any combination of the aforementioned.

As represented by step 120, after the information has been received the system may transmit the received information to at least one database. In an exemplary embodiment, the transmitted information will include at least a primary identifier and the at least one secondary identifier. The information may be transmitted to a server maintained by the entity responsible for providing a comparison shopping experience, a database maintained by the entity responsible for providing a comparison shopping experience, a database maintained by a merchant or manufacturer associated with the item of interest, a website maintained by a merchant or manufacturer associated with the item of interest, a database maintained by a financial institution associated with a user account, a database maintained by a merchant associated with a user account and/or any combination of the aforementioned. As shown in FIG. 2, the one or more databases may contain a plurality of information related to various items including but not limited to, real estate, automotive vehicles, retail, entertainments, and the like.

In some embodiments, transmitting information to the at least one database may comprise the system being able to first extract the identifier from the captured information. Various methods of data extraction, such as optical character recognition (OCR), may be used to extract an identifier from the captured information. For example, the wearable computer may capture a picture of a barcode located on a product and the system may use OCR to extract the product SKU number from the photo. The identifier may be extracted before or after it is transmitted to a database or server. In an embodiment where the identifier is extracted before being transmitted, the identifier may be extracted by the wearable computer using an application that is executable on the wearable computer and configured for providing comparison shopping experiences. In an embodiment where the identifier is extracted after being transmitted, the identifier may be extracted by a server or database that is receiving the transmitted information and configured for providing (or aiding in providing) a comparison shopping experience.

As represented by step 130, after transmitting the received information to at least one database, the system may retrieve detailed information related to the first item of interest and at least one additional item of interest. To this extent, the detailed information is at least partially associated with the primary identifier and the at least one secondary identifier, and in some embodiments, the detailed information may comprise the identifiers themselves.

In some embodiments, retrieving the detailed information may first comprise conducting a plurality of searches for detailed information related to the items of interest. The system may search and retrieve information from one or more databases, servers, websites, and/or the like. In one embodiment, the wearable computer may directly search and retrieve information from a plurality of databases or websites. In another embodiment, the wearable device may communicate with a server maintained by the entity responsible for providing the comparison shopping experience such that the server retrieves the information on behalf of the wearable computer and subsequently communicates the information back to the wearable computer. In other embodiments, the information may be retrieved using other means such as screen scraping various websites.

In some embodiments, the system may be configured to determine that the transmitted captured information, or specifically the captured identifier, is not satisfactory for retrieving detailed information associated with the item of interest. Non-satisfactory information may refer to incomplete text information, pictures that are of poor quality, voice recordings that are of poor quality and the like. In such an embodiment, if it is determined that the captured information (e.g. identifiers) is not satisfactory for retrieving detailed information the system may be further configured to request, from the user, additional information or identifiers.

In an alternative embodiment, the system may be configured to automatically recapture the received/transmitted information.

As represented by step 140, after retrieving the detailed information related to the first item of interest and at least one additional item of interest, the system may present, to the user, a comparison of the items, and in particular a comparison of the detailed information that has been retrieved for each of the items. In an exemplary embodiment, the detailed information is presented in a comparison format on an optical head-mounted display in the wearable computer.

In some embodiments, presenting, on the optical head-mounted display in the wearable computer, the detailed information related to the first item of interest and the at least one additional item of interest may comprise the system first building a data file that comprises the detailed information for comparison. In addition to comprising the detailed information the data file may further comprise a format for which the information should be presented to the user on the optical head mounted display. In some embodiments, a user may previously specify through user preferences specific formats that the information for comparison should be presented in. The information may be arranged in several orientations including, but not limited to, presenting the information in a side-by-side orientation, presenting the information in an adjacent orientation, presenting the information in a Venn diagram, and the like. After the information has been presented the system may be further configured to sort the detailed information according to the individual parameters of each item according to a user command.

In one embodiment, the data file is a file that is continuously being built throughout the user's shopping experience. In this way, the user may initially identify two items of interest. The detailed information related to the items of interest may be presented to the user in a comparison format. The user may then specify an additional item of interest for which the detailed information may be retrieved and added to the data file, and subsequently added to the display, or in an alternative embodiment, the detailed information may replace the position of a current item of interest on the display.

In some embodiments, the system is further configured to store the data file that comprises the detailed information for comparison. The file may be stored locally on the wearable device, remotely in another server and/or database associated with the entity responsible for providing the comparison shopping experience, and/or remotely in another server and/or database associated with a third party entity. In this way, the user may additionally provide one or more commands that prompt the system to send the data file to the user (e.g. email) or another party specified by the user (e.g. online banking, third party website, and the like). In some embodiments, the system may be configured to share the comparison information on a social networking site in response to receiving the user command.

In some embodiments, the system is configured to aggregate one or more values within the detailed information and present the aggregated value, to the user, on the optical head mounted display. For example, the user may request detailed information (e.g. average cost) for a plurality of house located within a neighborhood. As such the wearable computer may obtain a snap shot of a row of houses on a particular street, send the plurality of identifiers to a database, and obtain the cost of each individual house such that the system can subsequently calculate the average cost of the houses located on the street.

In some embodiments, the system may be configured to retrieve detailed information for items that are comparable to the items of interest. To this extent, the comparable item may be later presented to the user along with the items of interest. In doing so, the system may be further to present suggestion to the user's for potential items of interest, where the suggestions comprise the detailed information related to the comparable items.

Referring to FIG. 4, a network environment is illustrated in accordance with embodiments of the present invention. As illustrated in FIG. 4, the remote server 402 is operatively coupled via a network 401 to the wearable computer 404 and/or a third party database 406. In this configuration, the remote server 402 may send information to and receive information from the wearable computer 404 and/or the third party database 406. Additionally, the wearable computer 404 may send and receive communications directly from the third party database 406. The remote server 402 may be or include one or more network base stations or other network components. FIG. 4 illustrates only one example of an embodiment of a network environment 400, and it will be appreciated that in other embodiments one or more of the systems, devices, or servers may be combined into a single system, device, or server, or be made up of multiple systems, devices, or server.

The network 401 may be a global area network (GAN), such as the Internet, a wide area network (WAN), a local area network (LAN), a telecommunication network or any other type of network or combination of networks. The network 401 may provide for wire line, wireless, or a combination wire line and wireless communication between devices on the network 401.

In some embodiments, the user 405 is an individual who is wearing the wearable computer or has the wearable computer in he/she's possession.

As illustrated in FIG. 4, the remote server 402 generally comprises a communication device 450, a processing device 452, and a memory device 454. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the system are allocated between these processing devices according to their respective capabilities. The processing device may include functionality to operate one or more software programs based on computer readable instructions thereof, which may be stored in a memory device.

The processing device 452 is operatively coupled to the communication device 450 to communicate with the network 401 and other devices on the network 401. As such, the communication device 450 generally comprises a modem, server, or other device for communicating with other devices on the network 401.

As further illustrated in FIG. 4, the network remote server 402 comprises computer readable instructions 458 of an application 460. In some embodiments, the memory device, 454 includes data storage 456 for storing data related to and/or used by the application 460. The application 460 may perform one or more of the steps and/or sub-steps discussed herein and/or one or more steps not discussed herein. For example, in some embodiments, the application 460 may provide detailed information about one or more items of interest to the wearable computer 404.

As illustrated in FIG. 4, the wearable computer 404 generally comprises a communication device 430, a processing device 432, and a memory device 434. The processing device 432 is operatively coupled to the communication device 430 and the memory device 434. In some embodiments, the processing device 432 may send or receive data from the wearable computer 404, to the remote server 402 via the communication device 430 over a network 401. As such, the communication device 430 generally comprises a modem, server, or other device for communicating with other devices on the network 401.

As further illustrated in FIG. 4, the wearable computer 404 comprises computer readable instructions 438 stored in the memory device 434, which in one embodiment includes the computer-readable instructions 438 of an application 440. In the embodiment illustrated in FIG. 4, the application 440 allows the wearable computer 404 to be linked to the remote server 402 to communicate, via a network 401. The application 440 may also allow the wearable computer 404 to connect directly (i.e. locally or device to device) with the third party database 406 for sending and receiving information. The application 440 may perform one or more of the steps and/or sub-steps discussed herein and/or one or more steps not discussed herein. For example, in some embodiments, the application 440 may receive information to be presented on an optical head mounted display within the wearable computer.

As illustrated in FIG. 4, the third party database 406 may include a communication device 410, a processing device 412, and a memory device 414. The processing device 412 is operatively coupled to the communication device 410 and the memory device 414. In some embodiments, the processing device 412 may send or receive data from the wearable computer 404 and/or the remote server 402 via the communication device 410. Such communication may be performed either over a direct connection and/or over a network 401. As such, the communication device 410 generally comprises a modem, server, or other device for communication with other devices on the network 401.

As further illustrated in FIG. 4, the third party database 406 comprises computer-readable instructions 418 of an application 420. In the embodiment illustrated in FIG. 4, the application 420 allows the database 406 to be linked to the remote server 402 to communicate, via a network 401. The application 420 may also allow the wearable computer 404 to connect directly (i.e., locally or device to device) with the third party database 406 or indirectly through the network 401. The application 420 may perform one or more of the steps and/or sub-steps discussed herein and/or one or more steps not discussed herein.

It is understood that the servers, systems, and devices described herein illustrate one embodiment of the invention. It is further understood that one of more of the server, systems, and devices can be combined in other embodiments and still function in the same or similar way as the embodiments described herein.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for aiding with purchase inquiries, whereby the apparatus provides comparison shopping experiences through an optical head-mounted display in a wearable computer, the apparatus comprising:

a memory;

a computing processor; and a module stored in memory, said module comprising instruction code executable by one or more computing processors, and configured to cause the one or more computing processors to:

receive, from the wearable computer, GPS coordinates;

based on the GPS coordinates, determine whether a user of the wearable computer is located in a shopping environment;

in response to determining that the user is located in the shopping environment, launch, on the wearable computer, an application configured to provide a comparison shopping experiences using the optical head-mounted display of the wearable computer;

receive, from the application launched on the wearable computer, a first image captured by the wearable computer, the first image depicting a first item and a second item;

determine that the first image is not satisfactory by (1) determining that the first image comprises an incomplete identifier of the first or second item or (2) determining that the first image is of poor quality;

in response to determining that the first image is not satisfactory, capture, using the application launched on the wearable computer, a second image depicting the first item and second item;

extract from the second image, using optical character recognition, a first identifier of the first item and a second identifier of the second item;

determine that the first and second items are items of interest based on (1) receiving a command indicating that the user has located items of interest or (2) comparing the first and second identifiers to a wish list of the user;

transmit, to at least one database, the first identifier and the second identifier;

retrieve, from at least one database, detailed information related to the first item of interest and the second item of interest, wherein the detailed information is associated with the first identifier and the second identifier; and present, on the optical head-mounted display of the wearable computer, the detailed information related to the first item of interest and the second item of interest, wherein the detail information is presented in a comparison format.

2. The apparatus of claim 1, wherein the module is further configured to cause the one or more computing processors to search, the at least one database, for detailed information related to the first item of interest and the second item of interest.

3. The apparatus of claim 1, wherein the at least one database comprises information related to one or more items that are comparable to the first and second items of interest.

4. The apparatus of claim 1, wherein the module is further configured to cause the one or more computing processors to (1) build a data file that comprises the detailed information related to the first item of interest and the second item of interest and (2) store the data file on the wearable computer.

5. The apparatus of claim 1, wherein the comparison format is specified by the user.

6. The apparatus of claim 1, wherein the first image is determined to not be satisfactory by determining that the first image comprises an incomplete identifier of the first or second item.

7. The apparatus of claim 1, wherein the first image is determined to not be satisfactory by determining that the first image is of poor quality.

8. The apparatus of claim 1, wherein determining that the first and second items are items of interest is based on receiving a command indicating that the user has located items of interest.

9. The apparatus of claim 1, wherein determining that the first and second items are items of interest is based on comparing the first and second identifiers to a wish list of the user.

10. A computerized method for providing comparison shopping experiences through an optical head-mounted display in a wearable computer, the method comprising:

receiving, from the wearable computer, GPS coordinates;

based on the GPS coordinates, determining whether a user of the wearable computer is located in a shopping environment;

in response to determining that the user is located in the shopping environment, launching, on the wearable computer, an application configured to provide a comparison shopping experiences using the optical head-mounted display of the wearable computer;

receiving, from the application launched on the wearable computer, a first image captured by the wearable computer, the first image depicting a first item and a second item;

determining that the first image is not satisfactory by (1) determining that the first image comprises an incomplete identifier of the first or second item or (2) determining that the first image is of poor quality;

in response to determining that the first image is not satisfactory, capturing, using the application launched on the wearable computer, a second image depicting the first item and second item;

extracting from the second image, using optical character recognition, a first identifier of the first item and a second identifier of the second item;

determining that the first and second items are items of interest based on (1) receiving a command indicating that the user has located items of interest or (2) comparing the first and second identifiers to a wish list of the user;

transmitting, to at least one database, the first identifier and the second identifier;

retrieving, from at least one database, detailed information related to the first item of interest and the second item of interest, wherein the detailed information is associated with the first identifier and the second identifier; and presenting, on the optical head-mounted display of the wearable computer, the detailed information related to the first item of interest and the second item of interest, wherein the detail information is presented in a comparison format.

11. The method of claim 10, the method further comprising searching, the at least one database, for detailed information related to the first item of interest and the second item of interest.

12. The method of claim 10, comprising (1) building a data file that comprises the detailed information related to the first item of interest and the second item of interest and (2) storing the data file on the wearable computer.

13. The method of claim 10, wherein the comparison format is specified by the user.

14. The method of claim 10, wherein the first image is determined to not be satisfactory by determining that the first image comprises an incomplete identifier of the first or second item.

15. The method of claim 10, wherein the first image is determined to not be satisfactory by determining that the first image is of poor quality.

16. The method of claim 10, wherein determining that the first and second items are items of interest is based on receiving a command indicating that the user has located items of interest.

17. The method of claim 10, wherein determining that the first and second items are items of interest is based on comparing the first and second identifiers to a wish list of the user.

18. A computer program product for providing comparison shopping experiences through an optical head-mounted display in a wearable computer, the computer program product comprising:

a non-transitory computer-readable medium comprising a set of codes for causing a computer to:

receive, from the wearable computer, GPS coordinates;

based on the GPS coordinates, determine whether a user of the wearable computer is located in a shopping environment;

in response to determining that the user is located in the shopping environment, launch, on the wearable computer, an application configured to provide a comparison shopping experiences using the optical head-mounted display of the wearable computer;

receive, from the application launched on the wearable computer, a first image captured by the wearable computer, the first image depicting a first item and a second item;

determine that the first image is not satisfactory by (1) determining that the first image comprises an incomplete identifier of the first or second item or (2) determining that the first image is of poor quality;

in response to determining that the first image is not satisfactory, capture, using the application launched on the wearable computer, a second image depicting the first item and second item;

extract from the second image, using optical character recognition, a first identifier of the first item and a second identifier of the second item;

determine that the first and second items are items of interest based on (1) receiving a command indicating that the user has located items of interest or (2) comparing the first and second identifiers to a wish list of the user;

transmit, to at least one database, the first identifier and the second identifier;

retrieve, from at least one database, detailed information related to the first item of interest and the second item of interest, wherein the detailed information is associated with the first identifier and the second identifier; and present, on the optical head-mounted display of the wearable computer, the detailed information related to the first item of interest and the second item of interest, wherein the detail information is presented in a comparison format.

19. The computer program product of claim 18, the computer program product further comprising a set of codes for causing a computer to search, the at least one database, for detailed information related to the first item of interest and the second item of interest.

20. The computer program product of claim 18, further comprising a set of codes for causing a computer to (1) build a data file that comprises the detailed information related to the first item of interest and the second item of interest and (2) store the data file on the wearable computer.

21. The computer program product of claim 18, wherein the comparison format is specified by the user.

22. The computer program product of claim 18, wherein the first image is determined to not be satisfactory by determining that the first image comprises an incomplete identifier of the first or second item.

23. The computer program product of claim 18, wherein the first image is determined to not be satisfactory by determining that the first image is of poor quality.

24. The computer program product of claim 18, wherein determining that the first and second items are items of interest is based on receiving a command indicating that the user has located items of interest.

25. The computer program product of claim 18, wherein determining that the first and second items are items of interest is based on comparing the first and second identifiers to a wish list of the user.

* * * * *